(12) United States Patent
Chabrowski

(10) Patent No.: US 12,072,186 B2
(45) Date of Patent: Aug. 27, 2024

(54) DOOR HANDLE FOR A VEHICLE

(71) Applicant: Huf Hülsbeck & Fürst GmbH & Co. KG, Velbert (DE)

(72) Inventor: Christian Chabrowski, Mülheim (DE)

(73) Assignee: Huf Hülsbeck & Fürst GmbH & Co. KG, Velbert (DE)

( * ) Notice: Subject to any disclaimer, the term of this patent is extended or adjusted under 35 U.S.C. 154(b) by 597 days.

(21) Appl. No.: 17/265,080

(22) PCT Filed: Jun. 3, 2020

(86) PCT No.: PCT/EP2020/065291
§ 371 (c)(1),
(2) Date: Feb. 1, 2021

(87) PCT Pub. No.: WO2020/245156
PCT Pub. Date: Dec. 10, 2020

(65) Prior Publication Data
US 2021/0302147 A1    Sep. 30, 2021

(30) Foreign Application Priority Data
Jun. 7, 2019 (DE) ...................... 10 2019 115 549.5

(51) Int. Cl.
*G01B 7/24* (2006.01)
*E05B 81/76* (2014.01)

(52) U.S. Cl.
CPC .............. *G01B 7/24* (2013.01); *E05B 81/77* (2013.01)

(58) Field of Classification Search
CPC ......... E05B 81/77; E05B 81/76; E05B 81/78; E05B 85/10; E05B 85/14; E05B 85/16;
(Continued)

(56) References Cited

U.S. PATENT DOCUMENTS

2017/0260778 A1   9/2017   Witte et al.
2019/0017302 A1   1/2019   Beck et al.

FOREIGN PATENT DOCUMENTS

DE          10212794 A1    6/2003
DE       102012107189 A1   1/2014
(Continued)

OTHER PUBLICATIONS

Office Action for European Application No. 20730600.2 mailed on Mar. 23, 2023, with its English Translation, 14 pages.
(Continued)

*Primary Examiner* — Christine M Mills
*Assistant Examiner* — Yahya Sidky
(74) *Attorney, Agent, or Firm* — Peter W. Schroen; Bret E. Field; Bozicevic, Field & Francis LLP

(57) ABSTRACT

The invention relates to a sensor system (10) for a movable part (1) of a vehicle (3), comprising: an actuating element (20) comprising at least one deformation region (40) in which an activation action can be sensed by an operator (5), at least one inductive activation means (60) arranged in the deformation region (40), and at least one sensor device (30) arranged on the actuating element (20) or on the movable part (1) for inductance measurement on the activation means (60). For this purpose, according to the invention, at least one shielding element (34) is provided for the at least one sensor device (30) in order to avoid interferences during the inductance measurement.

20 Claims, 7 Drawing Sheets

(58) Field of Classification Search
CPC ....... E05B 85/18; Y10T 292/57; G05B 19/00; G05B 23/00; H04K 1/00
USPC ...................................... 340/5.72, 5.2, 5.66
See application file for complete search history.

(56) References Cited

FOREIGN PATENT DOCUMENTS

| DE | 102014107809 | A1 | 12/2015 | | |
| --- | --- | --- | --- | --- | --- |
| DE | 102015100074 | A1 | 3/2016 | | |
| DE | 102015119096 | A1 | 5/2017 | | |
| EP | 3664046 | A1 | 6/2020 | | |
| JP | H05-144355 | A | 6/1993 | | |
| JP | 2007-032179 | A | 2/2007 | | |
| JP | 2011-216255 | A | 10/2011 | | |
| WO | WO2004007879 | A1 | 1/2004 | | |
| WO | WO-2014012763 | A1 * | 1/2014 | ............ | E05B 81/77 |
| WO | WO2014012763 | A1 | 1/2014 | | |
| WO | WO2016188694 | A1 | 12/2016 | | |
| WO | WO-2017009073 | A1 * | 1/2017 | ........... | E05B 1/0015 |
| WO | WO2017009073 | A1 | 1/2017 | | |
| WO | WO2018197771 | A1 | 11/2018 | | |

OTHER PUBLICATIONS

Notice of Reasons for Refusal for Japan Patent Application No. 2021-516805, mailed Mar. 5, 2024, and its English translation, 14 pages.

* cited by examiner

Figure 2:
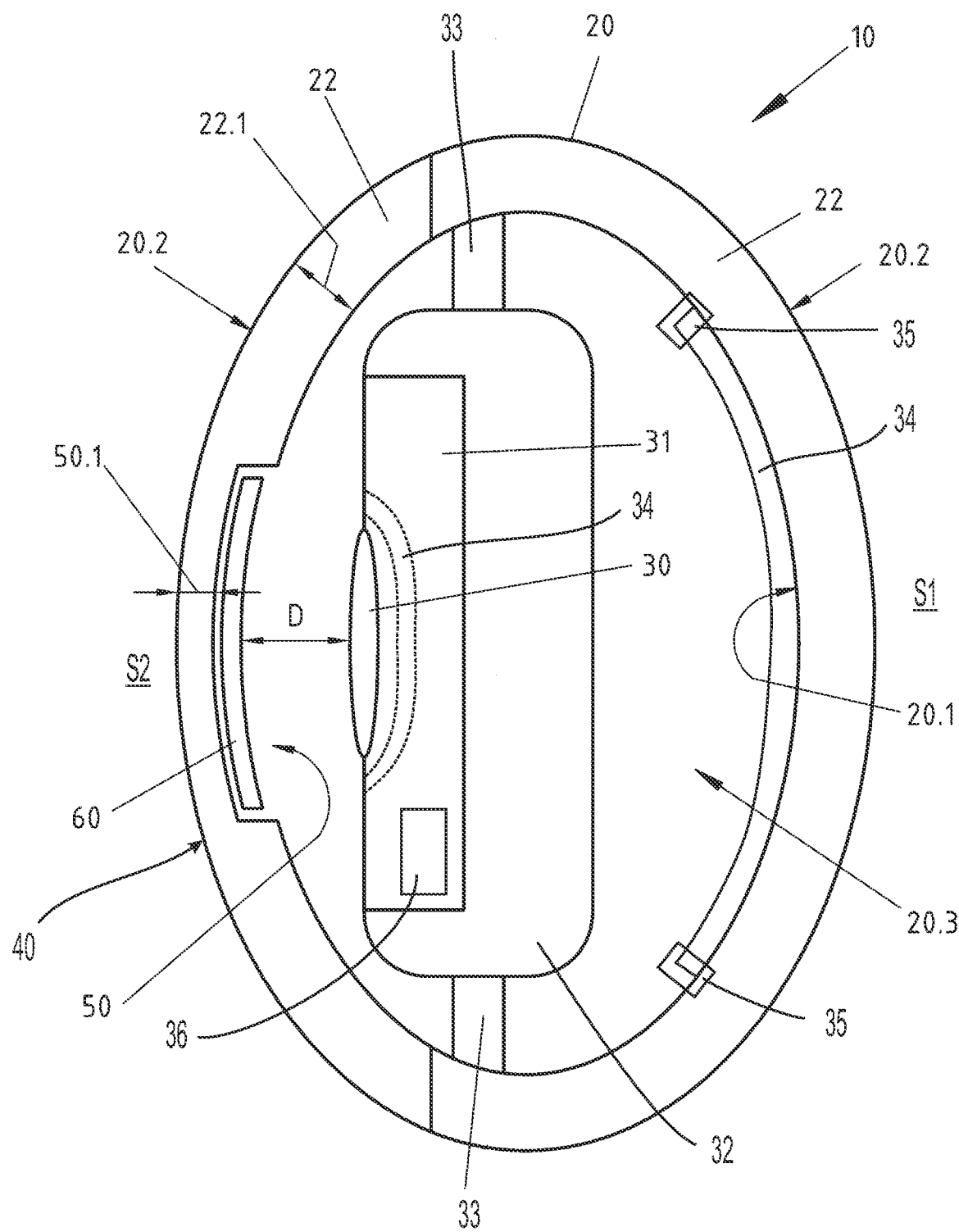

Fig. 2  Schnitt A-A

DOOR HANDLE FOR A VEHICLE

The invention relates to a sensor system for a movable part of a vehicle, for example in the form of a door handle for a door or a lid of the vehicle, with an inductive sensor device according to the preamble of the independent device claim. Further, the invention relates to a method for detecting an activation action on a sensor system of a vehicle, for example in the form of a door handle of the vehicle, according to the preamble of the independent method claim.

It is known from the prior art that sensor systems, e.g. integrated in door handles of vehicles, are used to activate an electric lock of the vehicle and consequently to actuate a movable part of the vehicle. The electric lock is, for example, an electrically controllable door lock. The unlocking of the lock can be triggered, for example, by an ID transmitter (identification transmitter), which transmits a code to a security system of the vehicle for authentication for this purpose, for example. It is also possible that an activation, such as waking up the ID transmitter and/or unlocking or opening the lock, only occurs during or after the operator or a hand of the operator approaches and/or when the operator exerts force on a door handle body of the door handle during or after authentication has occurred. The approach or exertion of force is detected in some door handles by inductive sensors.

It has been found to be a disadvantage that the detection by the inductive sensors can be prone to errors and/or interferences. For example, when approaching the door handle with a cell phone or a metallic object, a mere approach without a touch can already lead to faulty triggering of the inductive sensor.

The invention is based on the object of at least partially eliminating the above-described disadvantages in a sensor system, for example in the form of a door handle, for a movable part of a vehicle, in particular for activating an electric lock of the vehicle for the purpose of actuating, preferably opening, the movable part of the vehicle, with an inductive sensor device. In particular, it is an object of the invention to provide an improved sensor system or an improved door handle with an inductive sensor device. Preferably, it is an object of the invention to provide a sensor system or a door handle with an inductive sensor device, respectively, which enable to detect an activation action of an operator in a reliable, error-free and/or convenient manner.

The above object is solved by a sensor system, for example in the form of a door handle, having the features of the independent device claim, in particular from the characterizing part, and by a method having the features of the independent method claim, in particular from the characterizing part. Further features and details of the invention result from the respective dependent claims, the description and the figures. Features and details described in connection with the sensor system according to the invention naturally also apply in connection with the method according to the invention and vice versa in each case, so that reference is or can always be made mutually with regard to the disclosure of the individual aspects of the invention.

The object is solved in particular by a sensor system for a movable part of a vehicle (preferably a sensor system of modular design, e.g. in the form of an individually manageable modular unit, e.g. in the form of a (preferably normally fixed or immovable) door handle for a door or a lid of the vehicle, in particular for an activation of an electric lock of the vehicle for actuating (i.e. unlocking or locking and/or opening or closing) the door or lid of the vehicle, comprising an actuating element (e.g. in the form of a door handle body or a section of the movable part itself or a section of a vehicle outer skin which surrounds the movable part at least in partially, e.g. in the form of a B-pillar in the case of a vehicle door as a movable part of the vehicle) comprising at least one deformation region in which at least one (or more) activation action can be sensed by an operator, at least one inductive activation means arranged in the deformation region, and at least one sensor device arranged on the actuating element, for example within the door handle body, or on the movable part of the vehicle, for inductance measurement on the activation means. The inductance measurement is carried out by the sensor device, wherein the position and/or the geometry of the activation means can influence the inductance measurement.

The "vehicle" may preferably be a passenger car, a truck, an excavator, a tractor, a mobile working machine, a boat or an aircraft. Furthermore, in the context of the invention, the "movable part" or "movable component" is preferably understood to be a door, a lid, a sliding side door, a fuel filler lid, a tailgate or a glove compartment lid.

In principle, it is conceivable that the sensor system can be provided in the form of an individually manageable modular unit or electronic system box, wherein the body of the electronic system box can form the actuating element with at least one deformation region.

Finally, the electronic system box can be arranged on the door handle, on the movable component, for example in the form of a door or lid, or on a section of a vehicle outer skin which at least partially surrounds the movable part, in order to sense an activation action there. In this case, the deformation region can be aligned with a corresponding deformable surface of the door handle or movable component or a section of a vehicle outer skin that at least partially surrounds the movable part. The arrangement of the electronic system box may be in a releasable or non-releasable manner. For this purpose, a form- and/or force-locking fixing may be provided.

For this purpose, it is provided according to the invention that at least one shielding element is provided for the at least one sensor device in order to avoid interferences during the inductance measurement.

The activation action is in particular an exertion of force (by the operator) on the actuating element, e.g. in the form of a door handle body or a section of the movable part itself or a section of the vehicle outer skin which at least partially surrounds the movable part, which preferably causes a deformation in the deformation region. In this case, the activation action preferably occurs on an outer side (outer surface) of the actuating element or of the door handle body, which is correspondingly accessible by the operator during normal operation of the vehicle. The activation action can thereby serve, for example, for manual opening and/or closing of the movable part, wherein the movable part is preferably designed as a door (in particular as a front/side/ and/or sliding door) and/or a lid (in particular a tailgate, a fuel filler lid, a loading plug lid) of the vehicle. The vehicle is preferably a motor vehicle and/or a passenger car and/or a truck. Advantageously, the activation action occurs by contact or, in other words, by touching the actuating element or the door handle body in the deformation region.

In the case of a door handle as a, preferably modular, sensor system in the sense of the invention, contact with the actuating element or the door handle body can occur within the framework of a pulling movement and/or a pushing movement on the door handle, i.e. in particular on the door handle body, e.g. by a hand of the operator grasping around the door handle body. For this purpose, the operator grasps, for example, in a handle recess formed between the door handle body and the movable part.

In the case of a door as a movable part of the vehicle within the meaning of the invention, the actuating element may be embodied as a section of the door itself or as a section of the vehicle outer skin surrounding the opening for the door, for example on the B-pillar. Contact with the actuating element may be made by tapping the actuating element and/or pressing lightly on the actuating element, which may cause the door to open.

In the case of a fuel filler lid as a movable part of the vehicle within the meaning of the invention, the actuating element may be embodied as a section of the fuel filler lid itself or as a section of the vehicle outer skin surrounding the opening for the fuel filler lid. Contact with the actuating element may be made by tapping the actuating element and/or pressing lightly on the actuating element, which may cause the fuel filler lid to pop open.

A positive detection of the activation action by the sensor device leads to an activation of the electric lock (and/or an activation of a security device of the vehicle), which can lead (to unlocking and/or locking and/or) to opening and/or closing of the electric lock. An activation of the electric lock can be effected by a control of a (preferably electric) drive.

It can also be provided that the activation action by the operator can be detected by the sensor device exclusively in the deformation region. This has the advantage that any other action, such as the exertion of force, on the actuating element (e.g. in the form of a door handle body or a section of the movable part itself or a section of a vehicle outer skin which at least partially surrounds the movable part) is not incorrectly interpreted as an activation action. It may also be provided that the actuating element or the door handle body, in particular the wall of the actuating element or the door handle body, is largely or completely rigid outside the deformation region and/or is formed with a lower elasticity than in the deformation region.

The actuating element (e.g. in the form of a door handle body or a section of the movable part itself or a section of a vehicle outer skin which at least partially surrounds the movable part) can advantageously be made of plastic and/or comprise plastic at least for the most part or partially. In this context, the actuating element or the door handle body may be designed as a plastic injection-molded part with a recess or a cavity. It is also conceivable that the actuating element or the door handle body is designed at least in two parts, wherein the two parts are designed, for example, as upper and lower shells of a, preferably closed, housing and accommodate the sensor device for induction measurement in the (formed) interior of the shell, wherein simple assembly of the sensor device is possible. The housing may thereby only comprise openings for the passage of connecting lines. Consequently, the actuating element or the door handle body preferably comprises an interior, in particular a cavity, at least partially surrounded by the housing, wherein the sensor device preferably is arranged inside the housing of the actuating element or the door handle body, i.e. in this interior. The sensor device is thereby preferably arranged with all sensors or sensor elements and a control electronic system completely in the interior of the actuating element or the door handle body. It is also conceivable that the sensor device is encapsulated in the interior with a filling element, e.g. an elastic casting compound. The sensor device comprises, for example, at least one inductive sensor, such as an LDC sensor (inductance-to-digital converter). Finally, the housing can be positioned with the deformation region facing a corresponding deformable surface of the door handle or movable component or a section of a vehicle outer skin that at least partially surrounds the movable component. Via the housing, the sensor system as a whole can be fixed to the door handle, the movable part or the section of the vehicle outer skin surrounding the opening for the movable part.

The sensor device is used in particular for (indirect or contactless) measurement of the deformation of the actuating element, in particular the deformation and/or pulling movement of the door handle, in the deformation region due to the activation action. The activation action thus represents a deformation action (by an operator's touch). For example, the activation element or the door handle body comprises a mechanically deformable wall in the deformation region, possibly with a material weakening such as a recess, and/or with elastically deformable cover parts, in order to enable a deformation in the deformation region due to the activation action. Due to the activation action, which represents, for example, a load on the actuating element or the door handle body, such as a compressive or tensile load, a maximum deformation of approximately 0.01 mm to 2 mm, preferably 0.1 mm to 1 mm, particularly preferably a maximum of approximately 0.1 mm, can preferably occur. The corresponding values can, for example, be stored digitally as threshold values in a non-volatile data memory of the sensor device, wherein the threshold values can be read out by the sensor device and compared with the measured inductance values for the detection of the activation action. For this purpose, the metric values for the deformation are converted, for example, into inductance values and stored as such as threshold values to enable a direct comparison with the measured inductance values by the sensor device. The corresponding conversion factor depends on the geometry of the actuating element or the door handle body and/or the activation means in the deformation region and can be determined by tests, for example. In particular, the activation means is arranged in the deformation region in such a way that a deformation in the deformation region, or of the wall in the deformation region, comprises a direct effect on the structure and/or the geometry of the activation means and/or the distance of the activation means to the sensor device. Thus, a detection of the activation action can reliably occur.

The idea behind the invention is that interference effects caused by electromagnetic waves, e.g. from a cell phone, or inductive interference fields, e.g. from moving metallic objects, are specifically intercepted by the shielding element. The shielding element can preferably cover a region of the actuating element or the door handle body, a so-called interference region, which faces the interference. Most often, this interference region is located on a side of the actuating element or door handle that faces away from the vehicle and that faces outward into the vicinity of the vehicle. In other words, the shielding element in the sense of the invention can determine, preferably delimit, a sensing region of the sensor device, which is in particular aligned with the activation means. Advantageously, the shielding element can be arranged on the activation element or on the door handle body, inside or outside, in such a way that the functions of other sensor technologies, based for example on a capacitive or an NFC technology, are not interfered with. In the context of the invention, the shielding element can be formed in the form of a metal foil or a metal coating, which is applied, for example, with the aid of a sputter deposition, at the interference region of the actuating element or the door handle body. Advantageously, the shielding element can be formed simply and inexpensively, can be fixed or applied to the actuating element or to the door handle body simply and with little effort, and can reliably prevent erroneous and unwanted incorrect operation of the inductive sensor device. The shielding element according to the invention can intercept electromagnetic waves in particular and preferably inductive interference fields.

Furthermore, it may be advantageous within the scope of the invention that the sensor system is designed in the form of a door handle, in particular a fixed (or immovable) door handle (in the normal case defined by the normal actuation of the door handle), which is preferably attached immovably to the vehicle, in particular to the movable part of the vehicle. Alternatively, it is also conceivable that the door handle is formed as a movable, and in particular pivotally mounted, door handle. As a fixed door handle, the door handle preferably does not have any movable individual parts, such as buttons or the like, which can serve, for example, to detect the exertion of a force. The term "movable" is to be distinguished from "deformable", wherein in particular the deformation, in contrast to the movement of the movable individual parts, occurs monolithically and/or as a change in length and/or on the one-piece component, in particular the wall. In contrast, in the case of buttons, for example, a relative movement occurs between separate individual parts. In particular, therefore, the sensing of the deformation due to the activation action occurs contactlessly and/or immovably as an inductance measurement by the sensor device. The expression "fixed door handle" also refers in particular to the fact that the door handle with the door handle body cannot be deflected or pivoted relative to the movable part, in particular a door and/or a tailgate. In this case, an exertion of force to activate the electric lock, or the activation action, only has to be exerted in a partial region of the door handle body formed as a deformation region, and the entire door handle body does not have to be moved relative to the movable part. This has the advantage that a very comfortable and secure opening of the movable part and/or activation of the lock can occur.

Optionally, it can be provided within the scope of the invention that the sensor device comprises at least one inductive sensor, for example an LDC sensor, and/or is designed as an inductive sensor, for example an LDC sensor. The inductive sensor, for example the LDC sensor, is used in this case for sensing at least one change in an inductance, i.e. in particular for inductance measurement. For this purpose, various components and/or circuits are normally necessary, which in the case of the inductive sensor are combined on a chip, or in an integrated circuit. The inductive sensor and/or the sensor device are/is designed, for example, to simultaneously measure the impedance and the resonant frequency of an LC resonant circuit. Here, the sensor device is preferably insensitive to external influences such as moisture or contamination in the region of the actuating element or the door handle body. Consequently, false detection due to weather influences such as rain, which lead to interferences in capacitive sensors, for example, can be reliably avoided. A false detection due to external mechanical influences, which cause a force to be exerted on the actuating element or on the door handle body, can be avoided, for example, by the fact that only a partial region of the actuating element or of the door handle body comprises the deformation region and corresponding threshold values are used, which are specific for the respective activation action. A false detection due to external electromagnetic and/or inductive influences can advantageously be avoided by the shielding element according to the invention. In this context, the inductive sensor has the further advantage that it is very sensitive to deformations and can thus serve to detect the activation action very quickly and reliably. The sensor device thereby comprises, for example, a resolution below one micrometer with, for example, a bit depth for quantization of the measured inductance values of at least 10 to 24 or preferably 10 to 16 bits.

Furthermore, in a sensor system, the invention can provide that the actuating element or the door handle body is designed to be elastically deformable in the deformation region. According to an advantageous further development of the invention, it can further be provided that the sensor device for detecting the activation action is arranged at a distance from the activation means in such a way that the deformation of the actuating element or the door handle body is sensed by the inductance measurement. The activation means can be designed as an electrically conductive element, which is moved relative to the sensor device when the actuating element or the door handle body is deformed in the deformation region. The movement of the activation means generates a change in inductance in the sensor device. Each movement of the activation means can advantageously be represented as a reproducible and/or known change in inductance in the sensor device. The change in inductance is very sensitive to minute movements of the activation means. Thus, the inductance measurement can reliably detect an activation action as a mechanical deformation of the actuating element or the door handle body in the deformation region. Advantageously, the measured inductance change can be compared, for example, with a predetermined threshold value in order to positively detect the activation action only when the threshold value is exceeded.

Furthermore, the invention can provide that the shielding element is designed as an electrically conductive foil, preferably a metal foil, and/or an electrically conductive coating and/or at least one electrically conductive element, in particular made of metal. Thus, electromagnetic and/or inductive interference effects or interference fields can be intercepted at the shielding element. In this way, the shielding element can advantageously ensure that possible interference fields do not result in unintentional, in particular non-contact, actuation of the sensor device. Consequently, false detections by the sensor device can be avoided.

Furthermore, the invention may provide that the shielding element is completely galvanically isolated from the sensor device and the activation element. Furthermore, the shielding element may preferably be arranged at a distance from the sensor device of at least 800 μm. Thus, the shielding element does not need to be interconnected. Thus, the shielding element can be easily and conveniently mounted on the actuating element or on the door handle body. However, it is still conceivable that the shielding element can be interconnected to a mass or another potential in order to better dissipate the interference fields.

In addition, the invention can provide that the shielding element is arranged on the inner side of the actuating element or the door handle body, in particular on a side of the actuating element or door handle facing away from the vehicle. Thus, the shielding element can be arranged inconspicuously without disturbing the appearance of the actuating element or the door handle.

Furthermore, the invention can provide that the shielding element is arranged on the outer side of the actuating element or the door handle body, in particular on a side of the actuating element or door handle facing away from the vehicle. Thus, the shielding element can also be provided subsequently without having to change the finished actuating element or open the finished door handle.

Furthermore, the invention can provide that the shielding element is fixed to the actuating element or to the door handle body in a material-locking manner, in particular with the aid of an adhesive. Thus, a cost-effective mounting of the shielding element on the actuating element can be enabled.

Furthermore, it is conceivable that the shielding element can be applied to the actuating element or to the door handle body with the aid of an additive coating method, preferably a chemical vapor deposition or a physical vapor deposition, in particular with the aid of a sputter deposition. Thus, a uniform coverage of the interference region on the actuating element or on the door handle body can be achieved, which may comprise only a few atomic layers of conductive particles. Such a shielding element is advantageously weight-reduced.

Furthermore, it is conceivable that the shielding element is fixed to the actuating element or to the door handle body in a form- and/or force-locking manner, in particular with the aid of at least one engaging element. In this way, a particularly simple, preferably detachable fixing of the shielding element can be enabled.

It is also conceivable that the activation means is designed as an electrically conductive foil and/or conductive (printable) ink and/or an electrically conductive coating and/or at least one electrically conductive element, in particular made of metal, preferably elastically deformable and/or completely galvanically isolated, and is particularly preferably arranged on the inner side of the actuating element or the door handle body and/or on a structural adjustment of the wall. The activation means is thereby particularly preferably (e.g. exclusively) arranged at the deformation region and in particular releasably or non-releasably fixed in such a way that a deformation of the wall in the deformation region directly affects the activation means. The structural adjustment of the wall is, for example, a recess in the wall and, in particular, causes a material weakening of the wall in the deformation region. In this case, the structural adjustment comprises, for example, the complete vehicle-side wall of the actuating element or of the door handle body, on the outer side and/or on the inner side of the actuating element or of the door handle body. Alternatively, the structural adjustment comprises, for example, 1% to 80%, preferably 10% to 70%, preferably 30% to 50%, of the entire wall of the actuating element or of the door handle body. For example, the activation means is arranged substantially (i.e. also completely) at or in the (entire) structural adjustment, e.g. within the recess, and comprises e.g. 1% to 99%, preferably 10% to 70%, particularly preferably 30% to 50% of the structural adjustment. The activation means can preferably be arranged on the inner side or outer side of the wall in the region of the structural adjustment and/or the deformation region and/or at least partially inside the wall. In this context, the activation means preferably comprises metal, and is particularly preferably formed as a metal element. For example, it is conceivable that the activation means is arranged at the structural adjustment as a metal foil or other electrically conductive foil on the inner side of the actuating element or the door handle body. It is also possible that the activation means is formed as a chrome coating of the wall in the deformation region. The structural adjustment, in particular the recess, can thereby have an extension in the region from 500 mm$^2$ to 2000 mm$^2$, preferably essentially 1200 mm$^2$. The activation means is preferably partially or completely electrically isolated, i.e. in particular galvanically isolated and/or not electrically connected to an electronic system and/or the sensor device. The activation means is thus designed in particular to be galvanically isolated from any electronic system and/or other electrical components or the sensor device and is thus preferably a component that is only used inductively. This has the advantage that the susceptibility to errors can be greatly reduced, and thus a more reliable detection is possible.

It is also conceivable that at least one first deformation region with at least one first activation means is provided, in particular on the side facing the vehicle, on the actuating element or on the door handle body, and at least one second deformation region with at least one second activation means is provided, in particular on the side of the actuating element or of the door handle body facing away from the vehicle. It is also conceivable that further deformation regions with further activation means are provided. Also, for example, a first deformation region may be designed to take a tensile load of a first activation action, and a second deformation region may be designed to take a compressive load of a second activation action. The first deformation region and/or the first activation means can preferably be associated with the first activation action, and the second deformation region and/or the second activation means can be associated with the second activation action. In this case, the first activation action is assigned, for example, a first function, such as the unlocking or opening of the electric lock, and the second activation action is assigned a second function, such as the locking or closing of the lock. Thus, the advantage is achieved that a flexible operation of the sensor system can be performed.

A further advantage within the scope of the invention can be achieved if a first sensor device and a second sensor device are provided on the actuating element, for example within the door handle body, or on the movable part, wherein in particular the first sensor device is designed for inductance measurement on the first deformation region and the second sensor device is designed for inductance measurement on the first or on the second deformation region. Also in this case, the first sensor device can be assigned to a first activation action with a first function, and the second sensor device can be assigned to a second activation action with a second function. The first activation action comprises, for example, a tensile load and the second activation action comprises, for example, a compressive load on the actuating element or on the door handle body. The first activation action preferably occurs in the first deformation region and the second activation action preferably occurs in the second deformation region. The first and second sensor device can, for example, be electrically connected to each other or designed independently of each other and/or galvanically isolated from each other. Alternatively or additionally, it is conceivable that the second sensor device or a further sensor device is designed to take over the function of the first sensor device when a fault occurs in the first sensor device and to monitor the first activation means in the first deformation region. This can ensure improved fail-security.

Within the scope of the invention, it is possible for the first sensor device and the second sensor device are arranged on different sides of a printed circuit board. In this way, the sensor devices can monitor different detection regions to distinguish between different activation actions, such as for unlocking or opening the electric lock, and for locking or closing the lock. Thus, not only a flexible but also a reliable operation of the sensor system can be performed.

It is also conceivable that at least one or at least two or at least three or at least four sensor devices are arranged on the actuating element, e.g. inside the door handle body, i.e. in an interior of the door handle body, or behind the actuating element, which are distributed e.g. along the inner side of the actuating element or the door handle body. The sensor device or the sensor devices can be arranged on at least one printed circuit board and/or electrically connected to a control electronic system on the actuating element, for example in the interior of the door handle body. The electronic system of the sensor system can, for example, be arranged together with the sensor device on the printed circuit board. The sensor device is preferably arranged on the side of the printed circuit board facing the deformation region. A further electronic system can be arranged on the same or the opposite side. The sensor device may, for example, comprise at least one integrated circuit and/or at least one microprocessor and/or at least one coil and/or at least one non-volatile data memory. In this context, the sensor devices can, for example, each be assigned to different deformation regions of the actuating element or of the door handle body. In this way, one or more activation actions can be reliably detected at different regions of the actuating element or the door handle body.

Further, the invention may provide that a first shielding member is provided for a first sensor device and a second shielding member is provided for a second sensor device. Thus, the function of the first sensor device and the function of the second sensor device may be protected from misoperation.

Furthermore, the invention can provide that the first shielding element is arranged on the inner side of the actuating element or the door handle body and the second shielding element is arranged on the outer side of the actuating element or the door handle body. Advantageously, the first shielding element can be arranged behind the first sensor device on an inner side of the actuating element or the door handle body that faces away from the vehicle. Thus, the first shielding element can shield the interference region behind the first sensor device that is directed outward with respect to the vehicle. In this way, the first shielding element can ensure that only a deliberate, preferably manual, activation action, e.g. by reaching behind the door handle body into a recess between the door handle and the vehicle surface, is detected and that no unintentional non-contact false activation of the sensor device from outside the sensor system, in this case in the form of the door handle, is possible. Advantageously, the second shielding element can protect the operation of the second sensor device from false actuation. In this context, the second shielding element can be arranged before the second activation means, but can be galvanically isolated therefrom. Also in the case of the second shielding element, it may be advantageous if the second shielding element can shield an interference region to the outside, away from the vehicle. In the case of a second shielding element, it is conceivable that the second shielding element is attached to an outer side of the actuating element, for example in the form of the door handle body. Consequently, a galvanic isolation of the second shielding element from the second activation means can be ensured in a simple manner by the material of the wall of the actuating element or of the door handle body, which can preferably be made of plastic, if the second shielding element is arranged on the inner side of the actuating element or of the door handle body. Thus, the second shielding element can also be located in the region of a second deformation region like the second activation element.

In addition, it is conceivable that both the first shielding element and the second shielding element are arranged on the inner side of the actuating element or the door handle body. In this way, both elements can be positioned inconspicuously from the outside.

Furthermore, it can be provided that the wall of the actuating element or of the door handle body comprises a structural adjustment, in particular a recess and/or a material weakening, in the deformation region, wherein preferably the wall and/or the actuating element or the door handle body comprises, preferably exclusively, in the region of the structural adjustment and in particular due to the structural adjustment an elastic deformability which is sufficient for sensing with the sensor device and which is in particular increased in comparison with the deformability of the regions of the actuating element or of the door handle body adjacent to the deformation region. The deformation region is provided, for example, centrally on the actuating element or on the door handle body, and/or is surrounded by adjacent regions. The deformation region or the total area of all deformation regions comprises, for example, at least 2% and/or at least 4% and/or at least 8% and/or at least 10% of the total outer area of the actuating element or the door handle body. It is possible that a first structural adjustment is provided in a first deformation region and a second structural adjustment is provided in a second deformation region. The structural adjustment is preferably a material weakening, in particular in the form of a recess in the wall of the actuating element or of the door handle body in the deformation region. This ensures that a slight deformation caused by the activation action on the actuating element or the door handle body can be sensed by the sensor device in terms of measurement. The structural adjustment, in particular the recess, can preferably be arranged on the actuating element or on the door handle body in such a way that a deformation measurable by the sensor device occurs when the actuating element in the form of the door handle body is grasped by a hand of the operator to perform the activation action.

A further advantage within the scope of the invention can be achieved if the structural adjustment is formed on the outer side of the actuating element or the door handle body, in particular on a wall of the actuating element or the door handle body in the deformation region. It may be possible for the structural adjustment, i.e. in particular the recess, to be clearly visible from the outside by the operator. This has the advantage that the actuation region for performing the activation action in the deformation region is indicated for the operator. Alternatively or additionally, it is conceivable that the structural adjustment or a further (second) structural adjustment is formed only on the inner side of the actuating element or the door handle body. Thus, an outwardly visible flat and closed surface is achieved. Accordingly, it is also possible for the activation means to be arranged on the inner side or outer side of the actuating element or the door handle body. In this case, the activation means can be designed to be visible from the outside or to be arranged in the interior of the actuating element or the door handle body in such a way that it cannot be recognized by the operator from the outside.

Furthermore, it may be possible that the structural adjustment and/or the activation means is formed both on the outer side (recognizable) and on the inner side (non-recognizable) of the actuating element or the door handle body, in particular on the wall in the deformation region. Thus, the detection can be further improved.

Furthermore, it can be provided within the scope of the invention that an average wall thickness of the wall outside the deformation region is at least 50% greater than in the deformation region, wherein preferably the average wall thickness of the wall in the deformation region (recess wall thickness), in particular of the structural adjustment, is in the range of 1 mm to 2 mm, preferably 1.3 mm to 1.7 mm, and preferably is at least substantially 1.5 mm. It is also conceivable that the wall thickness of the actuating element or of the door handle body in the deformation region is, for example, in the range from 1.4 mm to 1.5 mm and is, for example, at most 40% or at most 70% or at most 80% or at most 90% of the wall thickness of the actuating element or of the door handle body outside the deformation region. The wall thickness of the actuating element or of the door handle body outside the deformation region, i.e. the normal wall thickness of the actuating element or of the door handle body, lies, for example, in a range from 2 mm to 3 mm, preferably 2.2 mm to 4 mm, wherein the wall thickness is particularly preferably essentially 2.5 mm or at least 2.4 mm. It is thus ensured that only the activation action in the deformation region leads to the deformation that can be sensed by the sensor device.

Furthermore, it can be advantageous within the scope of the invention that a distance between the sensor device and the activation means monitored by the sensor device is in the range of 1 mm to 5 mm, in particular 2 mm to 3 mm. In this case, the sensor device can, for example, measure deformations of approximately at least $\frac{1}{10}$ mm, wherein an opening signal for opening the lock is generated by the sensor device and/or a signal for activating a function of the vehicle is generated when a defined threshold value is exceeded. For this purpose, the sensor device is connected, for example, to central electronic system of the vehicle and/or to a security system of the vehicle. In particular, the distance, or the change in distance, between the sensor device and the activation means is measured by the sensor device in order to enable reliable detection of the activation action.

Furthermore, it can be advantageous within the scope of the invention that a region between the sensor device and the activation means, and in particular an interior of the actuating element or the door handle body, is at least partially filled with a filling element, in particular a casting compound. The filling element is thereby preferably arranged in the region of a distance between the sensor device and the activation means monitored by the sensor device. The filling element serves in particular to seal off moisture penetrating outside the actuating element or the door handle body and can be designed, for example, as a filler pack and/or foam and/or as a casting compound.

Furthermore, it can be advantageous within the scope of the invention that a capacitive sensor technology with at least one capacitive sensor technology element is provided on the actuating element, for example within the door handle body (e.g. in the interior/cavity). The capacitive sensor technology is used in particular for detecting an action, in particular an approach to the actuating element or to the door handle, in particular to the door handle body, in order to carry out a function of the vehicle, such as, for example, a locking and/or unlocking of the electric lock and/or of a central locking system of the vehicle in the event of a positive detection of the corresponding action. For this purpose, the capacitive sensor technology can, for example, output a corresponding control signal to a control apparatus of the vehicle and/or of a security system of the vehicle in the event of positive detection. It is possible that the vehicle functions controlled by the capacitive sensor technology differ from the vehicle function controlled by the sensor device. For example, an opening of the electric lock is exclusively initiated by the sensor device (upon detection of the activation action). In particular, it is not possible for the detection of the capacitive sensor technology alone to cause an opening of the electric lock, but only an unlocking of the electric lock. Unlocking the lock causes the movable part of the vehicle and/or the lock to open, whereas with a locked lock it may be possible to actuate the sensor system, but the movable part and/or the lock does not open. To be distinguished from unlocking is the opening of the electric lock, which causes a release of a blocking of the lock after unlocking. For this purpose, a mechanical, movable door handle is moved mechanically, for example, in order to open the lock and/or the movable part. In the case of the electric lock, the removal of the blocking (the opening of the lock) occurs after an electric control (opening signal), wherein, for example, the latch of the door lock is actuated under electric control and, if necessary, with a drive unit such as a servo unit or motor unit, without the need for exerting force on the door handle. In such electric locks, the mechanical deflection or adjustment of a door handle for opening becomes unnecessary, and the door handle can thus be fixed substantially immovably to the movable part. The opening signal, which is preferably output by the sensor device upon detection of the activation action, thus in particular causes the electric lock to open in such a way that the door handle only needs to be used immovably on the movable part for gripping and pulling on the movable part.

In addition, the invention can provide an NFC sensor technology with at least one NFC sensor technology element on the actuating element, for example within the door handle body. The NFC sensor technology extends the range of application of the actuating element according to the invention or of the door handle and enables secure transmission of, in particular, security-relevant data over relatively short distances, preferably up to 10 cm. With the aid of NFC technology, the operator can be enabled to use his mobile device, such as a smartphone or a tablet, as an ID transmitter and/or for communication with the vehicle, for example with a security system of the vehicle. An NFC chip may further be stored on a card as a communication means and/or as an ID transmitter chip. Advantageously, a card can be carried in the operator's wallet without taking up much space. In this way, carrying a conventional car key as an ID transmitter, which is massive and bulky, can be prevented.

Further, the invention may provide a single-layer or multilayer printed circuit board for the at least one sensor device, a control electronic system, and/or a capacitive sensor technology and/or an NFC sensor technology. Further, the invention may provide that the at least one sensor device, a control electronic system, a capacitive sensor technology, and/or an NFC sensor technology are arranged in one layer or in different layers of a printed circuit board. The arrangement in one layer may enable a reduced overall height arrangement of the elements next to each other. The arrangement in different layers may further serve to seal the elements layer by layer. In addition, the different layers of the printed circuit board can be used to install a shielding for the elements congruently over different layers of the printed circuit board.

Furthermore, the invention may provide that at least one of the following elements: the at least one sensor device, a control electronic system, a capacitive sensor technology and/or an NFC sensor technology is fixed on one side, in particular next to each other, or on different sides of a printed circuit board. Thus, a flexible selection of positions and sensing regions of the respective elements can be ensured.

Further, the invention may provide that a first sensor device and a second sensor device are fixed on different sides of a printed circuit board. In this way, two differently oriented sensing regions can be easily and conveniently provided, which can be clearly separated and allow secure actuation of different sensor devices.

Another object of the invention is a method for detecting an activation action on a sensor system, for example on a door handle, for a movable part of a vehicle, in particular for activating an electric lock of the vehicle for actuating, in particular opening, the movable part. In this case, it is provided that the activation action is performed by an operator on an actuating element of the sensor system or on a door handle body of the door handle in a deformation region in which an inductive activation means is arranged, and a sensor device performs an inductance measurement on the actuating element, for example within the door handle body, or on the movable part in order to detect the activation action. In this context, it is provided in particular that a shielding element is used for the sensor device to avoid interferences during the inductance measurement. Thus, the method according to the invention has the same advantages as have been described in detail with reference to a sensor system and/or door handle according to the invention. In addition, a sensor system according to the invention can be used for the method according to the invention.

According to an advantageous further development of the invention, it can be provided that the sensor device, in particular exclusively, outputs an opening signal, in particular to the electric lock of the vehicle, upon detection of the activation action, wherein the detection occurs in particular upon sensing of a deformation of the actuating element or of the door handle body of approximately 0.05 mm to 0.2 mm, preferably 0.1 mm. For example, a threshold value of 0.5 mm or 0.1 mm or 0.2 mm (converted as an inductance value, if necessary) can be specified, wherein a positive detection of the activation action and thus a triggering (activation) of a function of the vehicle occurs when the measured inductance value exceeds the threshold value. In this context, it may be provided that the, in particular electric, opening signal is output exclusively by the sensor device, and thus not by other sensor technology of the vehicle, and/or of the sensor system and/or of the door handle. For example, a capacitive sensor of the sensor system and/or of the door handle should not be used to output the opening signal and thus to trigger an opening of the electric lock, since this may lead to false triggering, for example due to external influencing factors. In contrast to such influencing factors, such as moisture due to rain or an approach of objects, the method according to the invention for detecting the activation action with the sensor device is largely insensitive.

According to a further advantage of the invention, it may be provided that a capacitive sensor technology is provided, wherein preferably the sensor technology detects an approach of the operator, in particular before detection of the activation action by the sensor device. In this context, it may be provided that a locking and/or unlocking of the lock is performed by the capacitive sensor technology. For this purpose, the capacitive sensor technology can have, for example, at least one capacitive sensor technology element, for example on the actuating element and/or in the interior of the door handle body. For example, it is conceivable that locking of the lock occurs when the sensor technology determines a removal of the user from the vehicle, and/or from the actuating element and/or from the door handle. On the other hand, the lock can be unlocked, for example, when the sensor technology determines an approach of the operator. When the approach is determined, the sensor technology can, for example, initiate the transmission of a wake-up signal to an ID transmitter and wait for a response signal from the ID transmitter. If authentication is successful on the basis of the response signal, the lock is then automatically unlocked. After successful unlocking of the lock, for example, the sensor device can be used to detect an activation action to cause the lock to be opened. Thus, it is conceivable that the detection of the activation device and/or the activation of a function of the vehicle, e.g., the opening of the lock, based on the detection of the activation action only occurs if a positive authentication and/or an unlocking of the lock has previously taken place. It is further conceivable that an opening signal is only output and/or an opening is only effected if the activation action is detected by the sensor device. The sensor technology and/or the sensor technology elements can, for example, be arranged at least partially adjacent to the sensor device, in particular on a common printed circuit board.

Furthermore, the invention may provide that an NFC sensor technology is provided, wherein preferably a communication with a mobile device, in particular a mobile radio telephone, of the operator is carried out with the aid of the NFC sensor technology, in particular before the activation action is detected by the sensor device. Preferably, the NFC sensor technology may serve for a verification of an authorization of the operator. Advantageously, the corresponding ID transmitter may be implemented by a mobile device or a card in the format of a business card.

Also under protection is a security system for a vehicle, in particular for an activation of an electric lock of the vehicle. The security system according to the invention comprises in particular a sensor system according to the invention and/or a door handle according to the invention and/or the electric lock and/or an ID transmitter and is preferably operable according to a method according to the invention. A vehicle with the security system and/or sensor system is also explicitly claimed within the scope of the invention.

Figure 1:
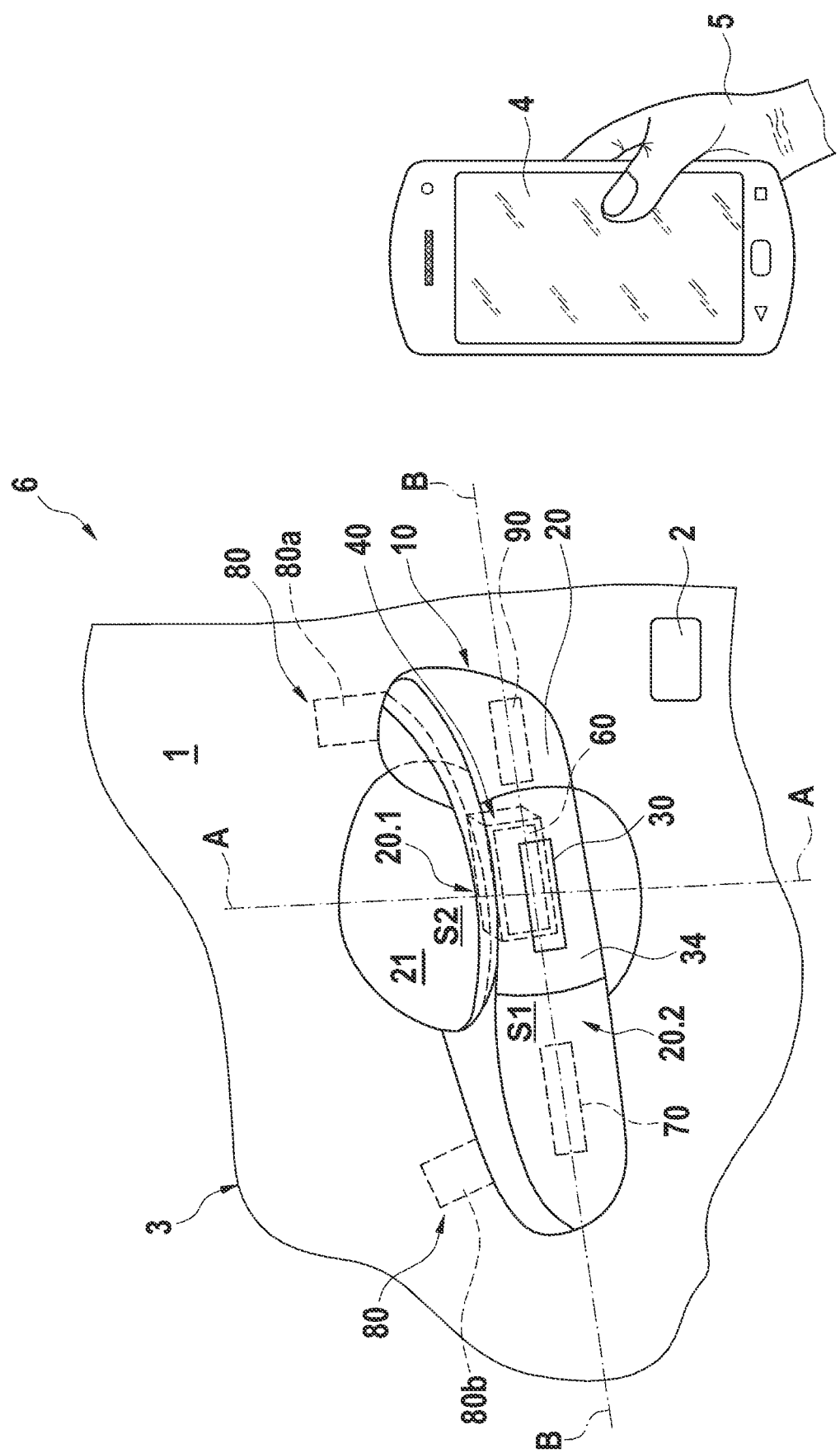
Figure 3:
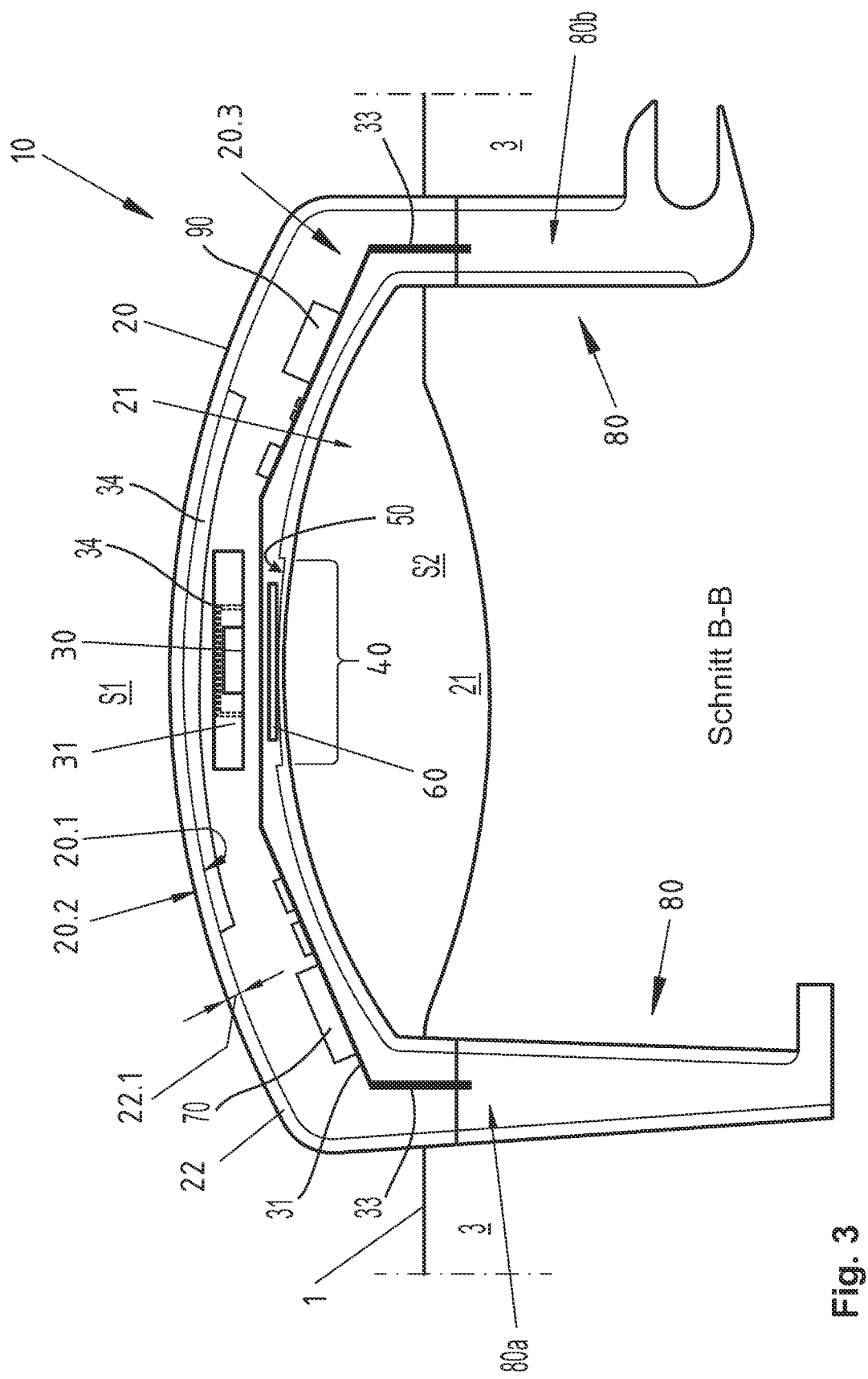
Figure 4:
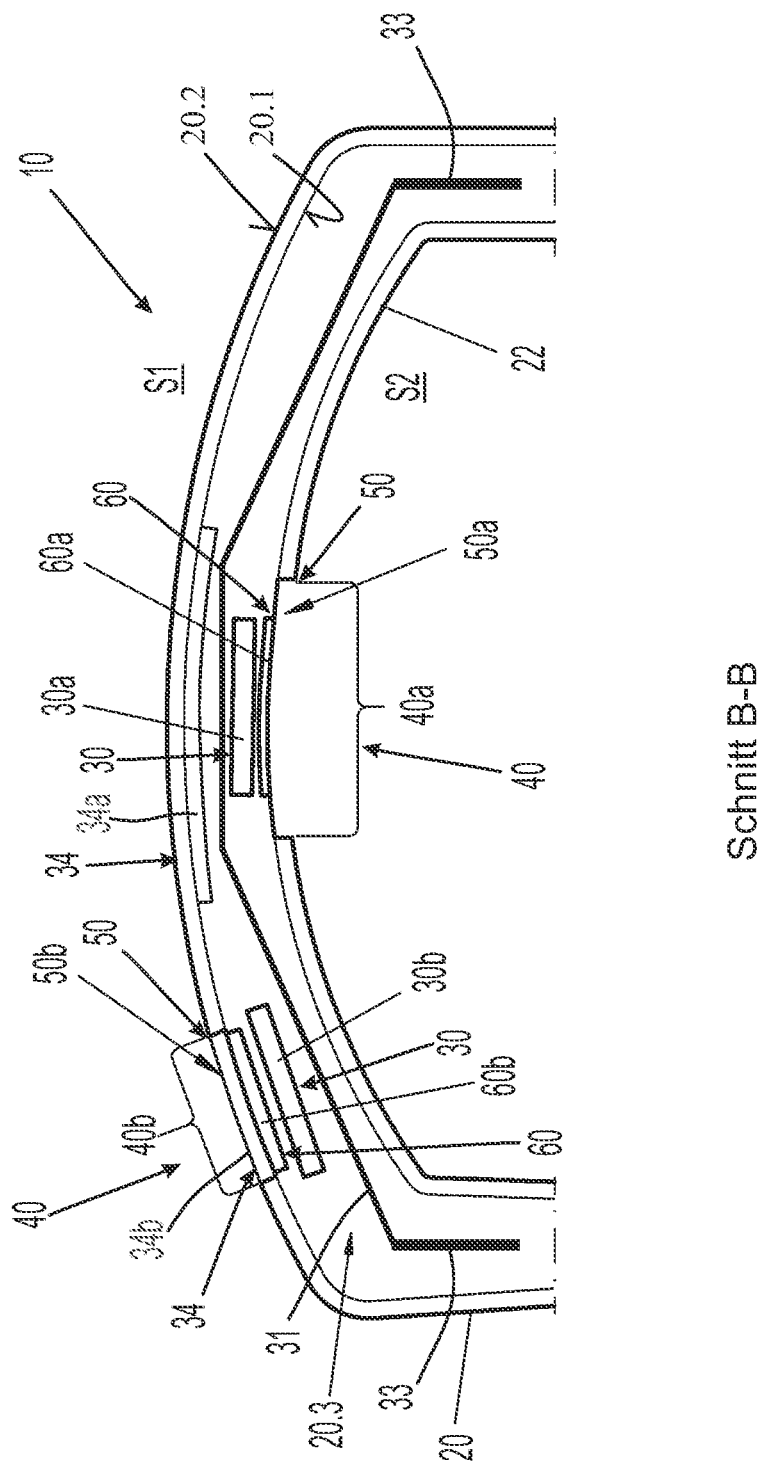
Figure 5A:
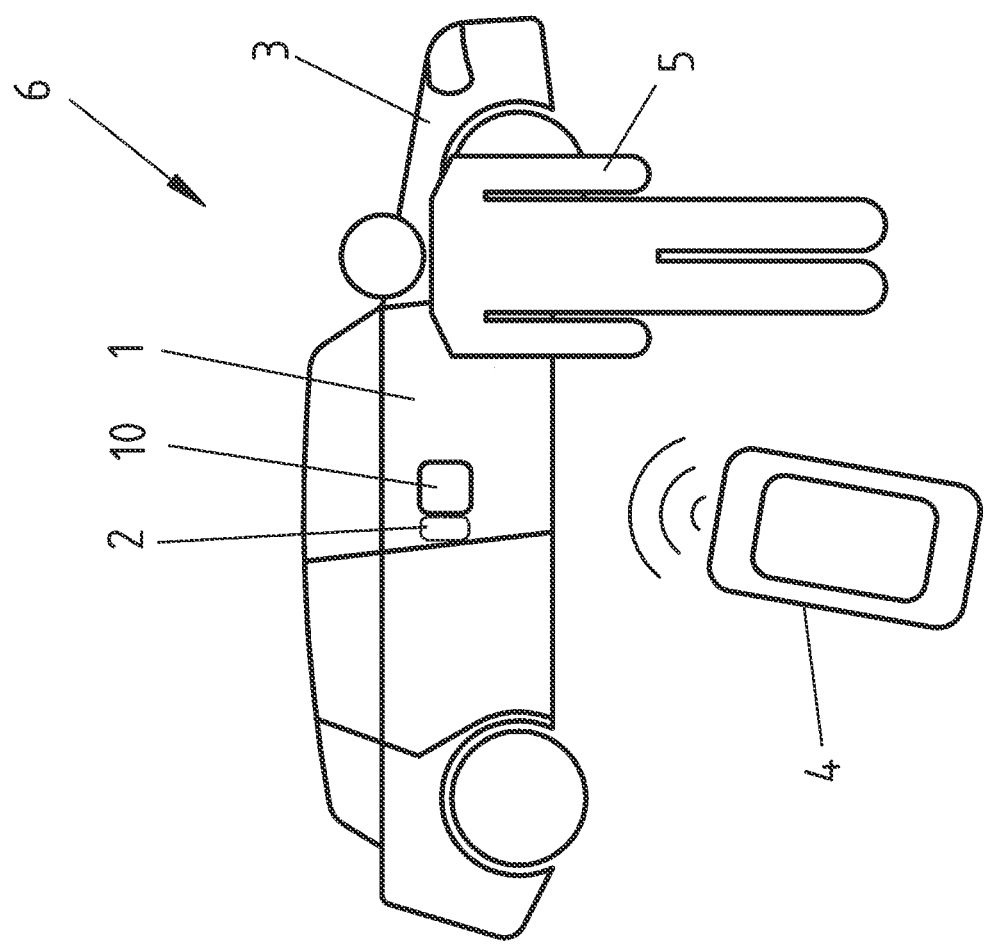
Figure 5B:
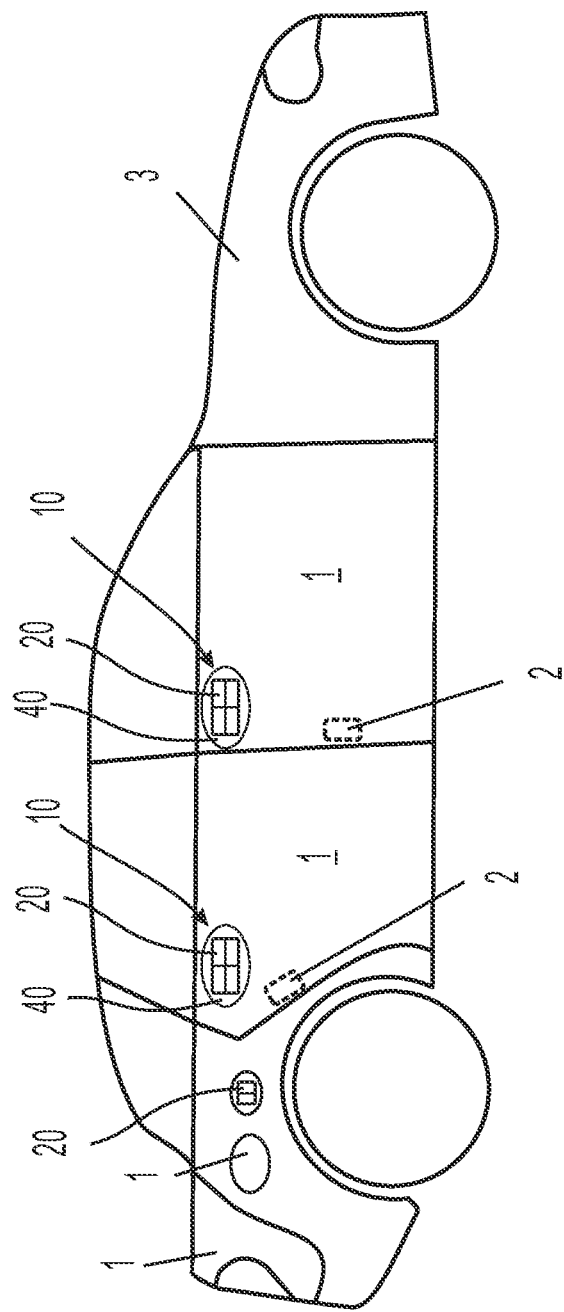
Figure 7:
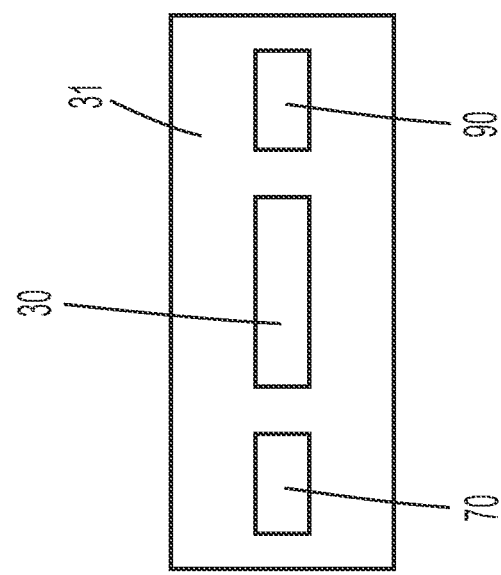
Figure 6:
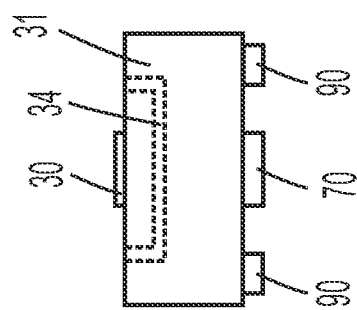

Further advantages, features and details of the invention will be apparent from the following description, in which embodiments of the invention are described in detail with reference to the figures. In this connection, the features mentioned in the claims and in the description may each be essential to the invention individually or in any combination. The figures show:

FIG. 1 a schematic perspective view of a sensor system according to the invention in the form of a door handle, FIG. 2 a schematic sectional view of a sensor system according to the invention in the form of a door handle, FIG. 3 a schematic sectional view of a sensor system according to the invention in the form of a door handle, FIG. 4 another schematic sectional view of a sensor system according to the invention in the form of a door handle, FIG. 5*a* a schematic view of a security system according to the invention, FIG. 5*b* a schematic view of a vehicle with the sensor system according to the invention, FIG. 6 a schematic representation of a possible printed circuit board for a sensor system according to the invention in the form of a door handle, and FIG. 7 a schematic representation of a further possible printed circuit board for a sensor system according to the invention in the form of a door handle.

In the following figures, the identical reference signs are used for the same technical features, even from different embodiment examples. As a rule, the reference signs of the same embodiment examples are described only once.

FIG. 1 schematically shows a sensor system 10 according to the invention in the form of a door handle 10, in particular the side S1 of the door handle 10 facing away from the vehicle. The sensor system 10 according to the invention or the door handle 10 according to the invention is designed for an activation of an electric lock 2 of a vehicle 3. The sensor system 10 according to the invention or the door handle 10 according to the invention can advantageously form part of a security system 6 of the vehicle 3, which is shown schematically in FIG. 5a. The operation of the security system 6 of the vehicle 3 will be discussed in detail below.

The sensor system 10 according to the invention or the door handle 10 according to the invention comprises an actuating element 20, for example in the form of a door handle body 20 with at least one deformation region 40. The deformation region 40, which is shown schematically in FIG. 1, is arranged on a side S2 of the door handle 10 facing the vehicle, which side is aligned with a handle recess 21 in the view of FIG. 1. In the deformation region 40 of the actuating element 20 or of the door handle body 20, an activation action of an operator 5 is sensed, for example, in order to open an electric lock 2. For this purpose, an inductive activation means 60 is arranged in the deformation region 40. In addition, the sensor system 10 according to the invention or the door handle 10 according to the invention comprises at least one sensor device 30 arranged within the actuating element 20 or the door handle body 20 for inductance measurement on the activation means 60. According to the invention, at least one shielding element 34 is provided for the at least one sensor device 30 in order to avoid interferences during the inductance measurement.

The shielding element 34 according to the invention advantageously precisely intercepts interference effects caused by electromagnetic waves, e.g. originating from a cell phone 4 of an authorized operator 5 or a foreign passer-by, or by inductive interference fields, e.g. originating from moving metallic objects. The shielding element 34 can preferably cover a region, a so-called interference region, of the actuating element 20 or of the door handle body 20, from which the interference can be expected to come. Most often, this interference region is located on a side S1 of the door handle 10 facing away from the vehicle 3. Advantageously, the shielding element 34 according to the invention can limit a sensing region of the sensor device 30 and, in particular, align it with the activation means 60.

It is conceivable that the shielding element 34 can be arranged on an inner side 20.1 of the actuating element 20 or of the door handle body 20, see FIGS. 1 to 3. Nevertheless, it is also conceivable that the shielding element 34 can be arranged on an outer side 20.2 of the actuating element 20 or of the door handle body 20, see e.g. a second shielding element 34b in FIG. 4.

Furthermore, it is possible that the shielding element 34 may be arranged on a side of the sensor device 30 facing away from the activation means 60 (see the dashed lines in FIGS. 1 and 3).

As further shown in FIGS. 1 to 3, the shielding element 34 can be arranged on the actuating element 20 or on the door handle body 20, on the inner side or outer side or embedded within the wall 22 of the actuating element 20 or of the door handle body 20, in such a way that the functions of other sensor system technologies, for example a capacitive sensor technology 70 and/or an NFC sensor technology 90, are not impaired.

The shielding element 34 according to the invention can be formed in the form of an eclectically conductive foil, preferably a metal foil, which can be adhered, for example, to the actuating element 20 or to the door handle body 20 (conceivable according to FIGS. 3 and 4). Furthermore, it is conceivable that the shielding element 34 according to the invention can be in the form of an electrically conductive plate, preferably made of metal, which can be fixed to the actuating element 20 or to the door handle body 20 in a form- and/or force-locking manner, for example, with the aid of at least one engaging element 35 (see, for example, FIG. 2). Furthermore, it is conceivable that the shielding element 34 according to the invention can be designed in the form of a metal coating which can be applied to the actuating element 20 or to the door handle body 20, for example, with the aid of a sputter deposition (conceivable according to FIGS. 3 and 4). The shielding element 34 according to the invention can be arranged on the inner side or outer side of the actuating element 20 or the door handle body 20 (see FIG. 4). According to FIG. 4, it is also conceivable that a second shielding element 34b can be arranged in the deformation region 40, in particular on the structural adjustment 50.

The actuating element 20 or the door handle body 20 can advantageously be made of plastic and/or comprise plastic at least for the most part or partially. The sensor device 30 is thereby preferably arranged with all sensors or sensor elements and a control electronic system 36 completely in an interior 20.3 of the actuating element 20 or the door handle body 20. It is also conceivable that the sensor device 30 can be cast in the interior 20.3 with a filling element, e.g. an elastic casting compound.

The sensor device 30 advantageously comprises at least one inductive sensor, such as an LDC sensor (inductance-to-digital converter). In this context, the sensor device 30 is used in particular for inductance measurement, i.e. for indirect or contactless measurement of the deformation and/or tensile movement of the actuating element 20 or of the door handle body 20 in the deformation region 40 due to the activation action.

The door handle 10 shown in FIG. 3 can be releasably or non-releasably, in particular immovably, fixed and/or mounted on a movable part 1 of the vehicle 3 by a fixing device 80, in particular in the region of a first handle bearing point 80a and/or a second handle bearing point 80b.

The door handle 10 shown in FIG. 1 may preferably be designed as a fixed door handle 10. In this case, at least one or two or all of the handle bearing points 80a, 80b of the fixing device 80 as shown in FIG. 3 may be designed as fixed bearings.

The door handle body 20 comprises a wall 22 with an outer side 20.2 and an inner side 20.1, which are shown in a sectional view A-A of FIG. 2. Here, it can be seen that the deformation region 40 can be formed on the inner side 20.1 of the wall 22 facing the vehicle. A structural adjustment 50 in the form of a recess can be formed in the deformation region 40. In this region, for example, an inductive activation means 60 can be arranged, which is monitored by the sensor device 30. Furthermore, it can be seen in FIG. 2 that the outer side 20.2 of the wall 22, which can normally be reached by an operator 5 from the outside, can be designed as a flat and/or closed surface of the door handle 10. Thus, the deformation region 40 can be arranged covered from outside.

FIG. 2 further shows that the deformation region 40 can have a closed surface on the outer side 20.2 of the door handle body 20 and can have a structural adjustment 50 in the form of a recess on the inner side 20.1 of the door handle body 20. In this regard, it can be seen that a recess wall thickness 50.1 is significantly less than a wall thickness 22.1 of the wall 22 outside the deformation region 40. In this regard, it is conceivable that the average wall thickness 22.1 of the wall 22 of the actuating element 20 or of the door handle body 20 outside the deformation region 40 is at least 50% greater than in the deformation region 40, wherein preferably the average wall thickness 22.1 of the wall 22 of the door handle body 20 in the deformation region 40, in particular the structural adjustment 50, is in the range from 1 mm to 2 mm, preferably 1.3 mm to 1.7 mm. This causes a material weakening 50 mm, which enables a deformation that can be sensed by a sensor device 30 during an activation action in the deformation region 40. For this purpose, the sensor device 30 is arranged at a distance D from the deformation region 40 and/or from an activation means 60 in the deformation region 40. The deformability of the wall 22 in the deformation region 40 differs in particular from the deformability of regions of the wall 22 outside the deformation region 40, as a result of which the sensor device 30 is not moved in the same way as the wall 22 in the deformation region 40 during an activation action. In the non-deformed state of the wall 22 in the deformation region 40, the distance D between the sensor device 30 and the activation means 60 monitored by the sensor device 30 is in the range from 1 mm to 5 mm, in particular 2 mm to 3 mm.

The activation action, which represents, for example, a load on the actuating element 20 or the door handle body 20, such as a compressive or tensile load, can preferably result in a maximum deformation of the actuating element 20 or the door handle body 20 of about 0.01 mm to 2 mm, preferably 0.1 mm to 1 mm, particularly preferably about 0.1 mm. The corresponding values can, for example, be stored digitally as threshold values in a non-volatile data memory of the sensor device 30. For this purpose, the metric values for the deformation are converted into inductance values in order to compare them with the measured inductance values. The corresponding conversion factor depends on the geometry of the actuating element 20 or the door handle body 20 and/or the activation means 60 in the deformation region 40 and can be determined empirically, for example.

Furthermore, FIGS. 2 to 4, 6 and 7 show that the sensor device 30 can be arranged on a printed circuit board 31 and/or electrically connected to a control electronic system 36. According to FIG. 2, the printed circuit board 31 of the sensor device 30 can be fixed to a holding device 32, which can be fixed to the inner side of the actuating element 20 or to the door handle body 20 with the aid of sensor bearing points 33. Alternatively, according to FIGS. 3 and 4, it is conceivable that the printed circuit board 31 can be fixed to the inner side of the door handle body 20 with the aid of sensor bearing points 33 without a separate holding device 32. According to the invention, a deformation of the wall 22 of the door handle body 20 in the deformation region 40 has no effect on the position of the sensor device 30 in the interior 20.3. In other words, the deformation only affects the distance D between the sensor device 30 and the activation means 60, wherein the degree of deformation can be measured by means of the distance D and/or the change in inductance.

As can be seen in FIGS. 2 to 4, the bearing of the sensor device 30 in the interior 20.3 of the actuating element 20 or of the door handle body 20 is formed independently of the bearing of the activation means 60. In this case, the activation means 60 is not only arranged at a distance from the sensor device 30, but is also galvanically isolated from the latter.

FIGS. 3 and 4 show a schematic sectional view (according to the sectional plane B-B in FIG. 1) through the door handle 10 according to the invention. Thereby, it can be seen that the activation means 60 can be formed as a coating of the wall 22 in the recess. Furthermore, it is conceivable that the activation means 60 can be formed as an electrically conductive foil or plate.

If an operator 5 now reaches into the handle recess 21 around the door handle body 20 and exerts a force in the deformation region 40, a deformation of the wall 22 in the deformation region 40 occurs. This deformation causes the activation means 60 to be deformed and/or moved relative to the sensor device 30 so that the distance D between the activation means 60 and the sensor device 30 (see FIG. 2) is reduced. The change in the distance D and/or the geometry of the activation means 60 can be sensed by an inductance measurement using the sensor device 30 to detect the activation action.

Referring to FIGS. 2 and 3, the door handle 10 may comprise a structural adjustment 50 on an inner side 20.1 of a wall 22 of a door handle body 20. Alternatively or additionally, according to FIG. 4, it is conceivable that a structural adjustment 50 on the outer side can be provided on an outer side 20.2 of a wall 22 of the actuating element 20 or of the door handle body 20 of the door handle 10 according to the invention. This has the advantage that the deformation region 40, at which in particular an activation action is carried out by an operator 5, can be recognized by the operator 5, for example haptically. At this deformation region 40, for example, a force can be exerted on the wall 22, which causes a deformation of the wall 22 in the deformation region 40 and/or of an activation means 60 in the deformation region 40 and/or a reduction of a distance D between the activation means 60 and the sensor device 30.

According to FIG. 4, a first deformation region 40a and a second deformation region 40b can be provided, each comprising a structural adjustment 50. A first activation action can be performed by the operator 5 in the region of a first structural adjustment 50a in the first deformation region 40a and a second activation action can be performed by the operator 5 at a second structural adjustment 50b in the second deformation region 40b, which can cause an activation of different functions of the vehicle 3. For example, a tensile load in the first deformation region 40a can cause the electric lock 2 to open by the first activation action, and a compressive load in the second deformation region 40b can cause the electric lock 2 to close by the second activation action. Accordingly, a first sensor device 30a for monitoring the first deformation region 40a and/or a first activation means 60a and a second sensor device 30b for monitoring the second deformation region 40b and/or a second activation means 60b are also provided.

In the case of FIG. 4, the invention may provide a shielding element 34 for each sensor device 30, namely for the first sensor device 30a and for the second sensor device 30b, namely a first shielding element 34a for the first sensor device 30a and a second shielding element 34b for the second sensor device 30b. Thus, the functions of the first sensor device 30a and the second sensor device 30b can be protected from false operation.

According to FIG. 4, it is conceivable that the first shielding element 34a can be arranged on the inner side of the door handle body 20 and the second shielding element 34b can be arranged on the outer side of the door handle body 20. In this case, the first shielding element 34a can advantageously be arranged behind the first sensor device 30a on the inner side 20.1 of the door handle body 20, which faces away from the vehicle 3. Thus, the first shielding element 34a can shield the interference region behind the first sensor device 30a that is directed outward with respect to the vehicle 3. Thus, the first shielding element 34a can ensure that only a deliberate, preferably manual, activation action, e.g. by reaching behind the door handle body 20 into the handle recess 21, is detected and that no unintentional contact-free false actuation of the sensor device from outside the vehicle 3 is possible. Advantageously, the second shielding element 34b can protect the operation of the second sensor device 30b from false actuation. In this regard, the second shielding element 34b may be arranged in front of the second activation means 60b, but may be galvanically isolated therefrom, for example at least one layer of the wall 22. Also in the case of the second shielding element 34b, it may be advantageous if the second shielding element 34b can shield an interference region to the outside, away from the vehicle. In the case of a second shielding element 34b, it is conceivable that it can be attached to an outer side 20.2 of the door handle body 20.

Nevertheless, it is also conceivable that both the first shielding element 34a and the second shielding element 34b can be arranged on the inner side 20.1 of the door handle body 20.

According to FIGS. 1 and 3 and FIGS. 6 and 7, a capacitive sensor technology 70 with at least one sensor technology element can be provided to detect further actions of the operator 5. This can be used, for example, to sense an approach by the operator 5 in order to activate further functions of the vehicle 3 or of a security system 6 of the vehicle 3.

According to FIGS. 1 and 3 and FIGS. 6 and 7, an NFC sensor technology 90 with at least one NFC sensor technology element may further be provided within the door handle body 20. The NFC sensor technology can advantageously serve to enable secure transmission of, in particular, security-relevant data over relatively short distances, preferably up to 10 cm. With the aid of NFC technology, the operator can be enabled to use his mobile device, such as a smartphone or a tablet, as an ID transmitter 4 and/or for communication with the vehicle 3, for example with the security system 6 of the vehicle 3. An NFC chip may further be stored on a card as a communication means and/or as an ID transmitter 4. Advantageously, a card can be carried in the wallet of the operator 5 without taking up much space.

Within the scope of the invention, a single-layer or multilayer printed circuit board 31 may be provided for the at least one sensor device 30, a control electronic system 36, a capacitive sensor technology 70 and/or NFC sensor technology 90. Furthermore, it is conceivable that the at least one sensor device 30, a control electronic system 36, a capacitive sensor technology 70 and/or an NFC sensor technology 90 may be arranged in one layer or in different layers of a printed circuit board 31.

FIG. 5a schematically shows a security system 6 according to the invention of a vehicle 3, wherein an approach of an operator 5 is detected, for example, by a capacitive sensor technology 70. Thereupon it can be provided that a wake-up signal is sent to an ID transmitter 4 in order to initiate an authentication process. It may be provided that exclusively only after successful authentication an opening of an electric lock 2 can occur by the activation action, which is detected by a sensor device 30. The ID transmitter 4 can, for example, be in the form of a mobile device, a smartphone or a simple card in the form of a business card with a chip.

In the further FIG. 5b, a sensor system 10 according to the invention is shown schematically on a vehicle 3. Here, instead of the door handles with the protruding door handle bodies otherwise present in the vehicle, the actuating elements 20 are used, which comprise the respective deformation region 40 and interact with the inductive activation means 60. In this case, the door panel or vehicle panel essentially constitutes the actuating element 20 on which the operator can press in order to generate a deformation in the deformation region 40, wherein this deformation can be sensed by the inductive activation means 60, which is arranged on the inner side of the door panel. By means of the respective actuating element 20, which is associated with the movable part 1 in each case, the movable part can then be opened, preferably automatically. As can be seen in FIG. 5b, the sensor system 10 with the respective actuating elements 20 serves to actuate the front doors 1, the rear doors 1 or the tailgate 1 or the fuel filler lid 1 on the vehicle 3. As shown, the actuating element 20 may be divided into different sub-regions to effect different functions, such as opening or closing the movable part 1 by means of the electric lock 2. For this purpose, the respective deformation region 40 may also be divided, for example, into different regions 40a, 40b. In the view of FIG. 5b, the respective shielding element 34 can be arranged in each case in front of the activation means 60 in the respective deformation region 40, but can be galvanically isolated from the latter, for example by at least one layer of the wall 22 of the actuating element 20.

FIG. 6 shows a side view of a possible printed circuit board 31 within the scope of the invention, wherein it can be seen that the sensor device 30 is arranged on the printed circuit board 31 together with a capacitive sensor technology 70 and an NFC sensor technology 90. The sensor device 30 is thereby arranged on the side of the printed circuit board 31 facing the deformation region 40. The sensor device 30 can, for example, be arranged on a different side of the printed circuit board 31 than the capacitive sensor technology 70 and the NFC sensor technology 90.

FIG. 7 shows a top view of an exemplary printed circuit board 31. The arrangement of the sensor device 30 on the printed circuit board 31 can be seen, wherein a capacitive sensor technology 70 and an NFC sensor technology 90 can be provided adjacent to the sensor device 30 on the same side of the printed circuit board 31.

In principle, it is conceivable that the capacitive sensor technology 70 and the NFC sensor technology 90 can be arranged spatially separated from each other, as indicated by FIG. 7. At the same time, it is conceivable that the capacitive sensor technology 70 and the NFC sensor technology 90 can use a common space, as indicated by FIG. 6. In this regard, it is conceivable that the NFC sensor technology 90 may comprise a coil that may surround the capacitive sensor technology 70. The capacitive sensing technology 70 may comprise an open conductor as an antenna, possibly with a branch structure.

The foregoing explanation of the embodiments describes the present invention exclusively in the context of examples. Of course, individual features of the embodiments can be freely combined with each other, provided that this is technically reasonable, without leaving the scope of the present invention.

LIST OF REFERENCE SIGNS 1 movable part
2 electric lock
3 vehicle
4 ID transmitter
5 operator
6 security system
10 sensor system, door handle
20 actuating element, door handle body
20.1 inner side 20.2 outer side
20.3 interior
21 handle recess
22 wall
22.1 wall thickness
30 sensor device
30 first sensor device
30b second sensor device
31 printed circuit board
32 holding device
33 sensor bearing point
34 shielding element
34a first shielding element
34b second shielding element
35 engaging element
36 control electronic system
40 deformation region
40a first deformation region
40b second deformation region
50 structural adjustment
50a first structural adjustment
50b second structural adjustment
50.1 recess wall thickness
60 activation means
60a first activation means
60b second activation means
70 capacitive sensor technology
80 fixing device
80a first handle bearing point
80b second handle bearing point
90 NFC sensor technology
D distance
S1 side of the door handle facing away from the vehicle
S2 side of the door handle facing the vehicle

The invention claimed is:

1. A sensor system for a movable part of a vehicle, comprising:
    an actuating element comprising at least one deformation region for sensing an activation action by an operator,
    at least one inductive activation means arranged in the deformation region,
    and at least one sensor device arranged at least on the actuating element or on the movable part for inductance measurement on the activation means,
    wherein
    at least one shielding element is provided for the at least one sensor device in order to avoid interferences during the inductance measurement,
    wherein
    at least the shielding element is designed as at least an electrically conductive foil or an electrically conductive coating or at least one electrically conductive element,
    and wherein the shielding element is completely galvanically isolated from the sensor device and the activation means,
    and wherein
    the shielding element is designed in such a way that interference effects caused by electromagnetic waves emanating from a mobile telephone and by inductive interference fields emanating from moving metallic objects are specifically intercepted by the shielding element.

2. The sensor system according to claim 1, wherein
at least the sensor system is designed in the form of a door handle or
the sensor device comprises an inductive sensor.

3. The sensor system according to claim 1, wherein
at least the actuating element is designed to be elastically deformable in the deformation region or the sensor device for detecting the activation action is arranged at a distance from the activation means in such a way that the deformation of the actuating element is detected by the inductance measurement.

4. The sensor system according to claim 1, wherein
the shielding element is arranged at a distance from the sensor device of at least 800 μm.

5. The sensor system according to claim 1, wherein
at least the shielding element is arranged on an inner side of the actuating element
or the shielding element is arranged on an outer side of the actuating element.

6. The sensor system according to claim 1, wherein
at least the shielding element is fixed to the actuating element in a material-locking manner,
or the shielding element is applied to the actuating element with the aid of an additive coating method, or the shielding element is fixed to the actuating element in at least a form- or force-locking manner.

7. The sensor system according to claim 1, wherein
the activation means is designed as at least an electrically conductive foil or an electrically conductive coating or at least one electrically conductive element.

8. The sensor system according to claim 1, wherein
at least one first deformation region with at least one first activation means is provided on a side of the actuating element facing the vehicle, and at least one second deformation region with at least one second activation means is provided.

9. The sensor system according to claim 1, wherein
a first sensor device and a second sensor device are provided on the actuating element or on the movable part.

10. The sensor system according to claim 1, wherein
a first shielding element is provided for a first sensor device and a second shielding element is provided for a second sensor device.

11. The sensor system according to claim 1, wherein
a first shielding element is arranged on an inner side of the actuating element and a second shielding element is arranged on an outer side of the actuating element,
or the first shielding element and the second shielding element are arranged on the inner side of the actuating element.

12. The sensor system according to claim 1, wherein
at least a wall of the actuating element comprises a structural adjustment in the deformation region or the structural adjustment is formed on an outer side of the actuating element.

13. The sensor system according to claim 1,
wherein
an average wall thickness of a wall of the actuating element outside the deformation region is at least 50% greater than in the deformation region.

14. The sensor system according to claim 1,
wherein
at least a distance between the sensor device and the activation means monitored by the sensor device is in the range of 1 mm to 5 mm or a region between the sensor device and the activation means is at least partially filled with a filling element.

15. The sensor system according to claim 1,
wherein
at least a capacitive sensor technology with at least one capacitive sensor technology element is provided on the actuating element
or an NFC sensor technology with at least one NFC sensor technology element is provided on the actuating element.

16. The sensor system according to claim 1,
wherein
at least a single-layer or multilayer printed circuit board is provided for at least the at least one sensor device, a control electronic system or a capacitive sensor technology or an NFC sensor technology, or at least the at least one sensor device, a control electronic system, a capacitive sensor technology or an NFC sensor technology are arranged in one layer or in different layers of a printed circuit board.

17. The sensor system according to claim 1,
wherein
at least one of the following elements: the at least one sensor device, a control electronic system, a capacitive sensor technology or an NFC sensor technology is fixed on one side or on different sides of a printed circuit board,
or a first sensor device and a second sensor device are fixed on different sides of a printed circuit board.

18. A method for detecting an activation action on a sensor system for a movable part of a vehicle
wherein the activation action is performed by an operator on an actuating element of the sensor system in a deformation region in which an inductive activation means is arranged, and
a sensor device performs an inductance measurement on the actuating element or on the movable part in order to detect the activation action,
wherein
a shielding element is used for the sensor device to avoid interferences during the inductance measurement,
wherein
at least the shielding element is designed as at least an electrically conductive foil or an electrically conductive coating or at least one electrically conductive element,
and wherein the shielding element is completely galvanically isolated from the sensor device and the activation means,
and wherein
the shielding element is designed in such a way that interference effects caused by electromagnetic waves emanating from a mobile telephone and by inductive interference fields emanating from moving metallic objects are specifically intercepted by the shielding element.

19. The method according to any claim 18,
wherein
the sensor device outputs an opening signal upon detection of the activation action.

20. The method according to claim 18,
wherein
at least a capacitive sensor technology is provided
or an NFC sensor technology is provided.

* * * * *